United States Patent
Vedel

(10) Patent No.: US 9,242,329 B2
(45) Date of Patent: Jan. 26, 2016

(54) DEVICE FOR DRILLING OR BORING OPENINGS

(76) Inventor: Mikhail Vladimirovich Vedel, Perm (RU)

( * ) Notice: Subject to any disclaimer, the term of this patent is extended or adjusted under 35 U.S.C. 154(b) by 612 days.

(21) Appl. No.: 13/391,529

(22) PCT Filed: Aug. 2, 2010

(86) PCT No.: PCT/RU2010/000427
§ 371 (c)(1),
(2), (4) Date: Feb. 21, 2012

(87) PCT Pub. No.: WO2011/021963
PCT Pub. Date: Feb. 24, 2011

(65) Prior Publication Data
US 2012/0148354 A1 Jun. 14, 2012

(30) Foreign Application Priority Data

Aug. 20, 2009 (RU) ................ 2009131616

(51) Int. Cl.
*B23Q 17/20* (2006.01)
*B23B 29/034* (2006.01)
*B23B 41/04* (2006.01)
*B23B 51/04* (2006.01)
(Continued)

(52) U.S. Cl.
CPC ............ *B23Q 17/20* (2013.01); *B23B 29/0346* (2013.01); *B23B 41/04* (2013.01); *B23B 51/0493* (2013.01); *B23Q 17/22* (2013.01); *B23B 2260/128* (2013.01); *B23Q 15/007* (2013.01); *Y10T 408/08* (2015.01)

(58) Field of Classification Search
CPC .................... B23B 29/03446; B23B 29/0345; B23B 29/03453; B23B 29/03457; B23B 29/0346; B23B 29/03464; B23B 29/03489; B23B 29/03492; B23B 29/03496; B23B 41/04; B23B 41/16; B23B 49/00; B23Q 15/007; B23Q 15/013
USPC ............ 82/1.2, 1.3, 1.4, 1.5; 408/2, 8, 10, 11, 408/12
See application file for complete search history.

(56) References Cited

U.S. PATENT DOCUMENTS 2,295,135 A * 9/1942 Smith .............................. 82/1.5
3,217,568 A * 11/1965 De Graffenried ............... 82/152
(Continued)

FOREIGN PATENT DOCUMENTS

| CD | 186530 A | 9/1936 |
|---|---|---|
| DE | 3829211 C1 | 5/1989 |
| GB | 635634 A | 4/1950 |

*Primary Examiner* — Sunil K Singh
*Assistant Examiner* — Alan Snyder
(74) *Attorney, Agent, or Firm* — John Alumit

(57) ABSTRACT

A device for drilling or boring openings, primarily deep openings, comprises a cutter head with guides, said head being equipped with a device for displacing the cutter in the radial direction from the drive. The input of the drive is connected via a control signal transmission circuit and a transducer to the output of a system for digital programming control (DPC). A sensor for checking variations in the wall thickness of the component, a sensor of the angle of rotation of the component, a sensor of the angle of rotation of the cutter head and a sensor for checking the wobbling of the component are connected to the DPC system. The drive of the device for displacing the cutter in the radial direction is in the form of a linear drive and is mounted on the cutter head. The technical result is expressed in an increase in the accuracy of machining deep openings while ensuring that said openings can be corrected during the process of machining the openings.

2 Claims, 1 Drawing Sheet

(51) Int. Cl.
  *B23Q 17/22* (2006.01)
  *B23Q 15/007* (2006.01)

(56) References Cited

U.S. PATENT DOCUMENTS

| | | | |
|---|---|---|---|
| 4,246,812 A * | 1/1981 | Gladwin et al. | 82/1.11 |
| 4,590,658 A * | 5/1986 | Funyu et al. | 29/464 |
| 5,123,787 A * | 6/1992 | Hunt | B23C 5/241 |
| | | | 407/39 |
| 5,336,026 A * | 8/1994 | Noggle | B23B 29/03421 |
| | | | 407/39 |
| 5,857,813 A * | 1/1999 | Kress et al. | 408/1 R |
| 5,947,658 A * | 9/1999 | Eysel | 408/147 |
| 6,312,200 B1 * | 11/2001 | Graham et al. | 408/1 R |
| 6,331,093 B1 * | 12/2001 | Graham et al. | 408/1 R |
| 7,011,613 B2 * | 3/2006 | Moller et al. | 483/1 |
| 7,089,837 B2 * | 8/2006 | Feil et al. | 82/1.4 |
| 7,824,135 B2 | 11/2010 | Radkowitsch et al. | |
| 2002/0029443 A1 | 3/2002 | Ortiz | |
| 2008/0298914 A1 * | 12/2008 | Nedzlek | 408/158 |

* cited by examiner

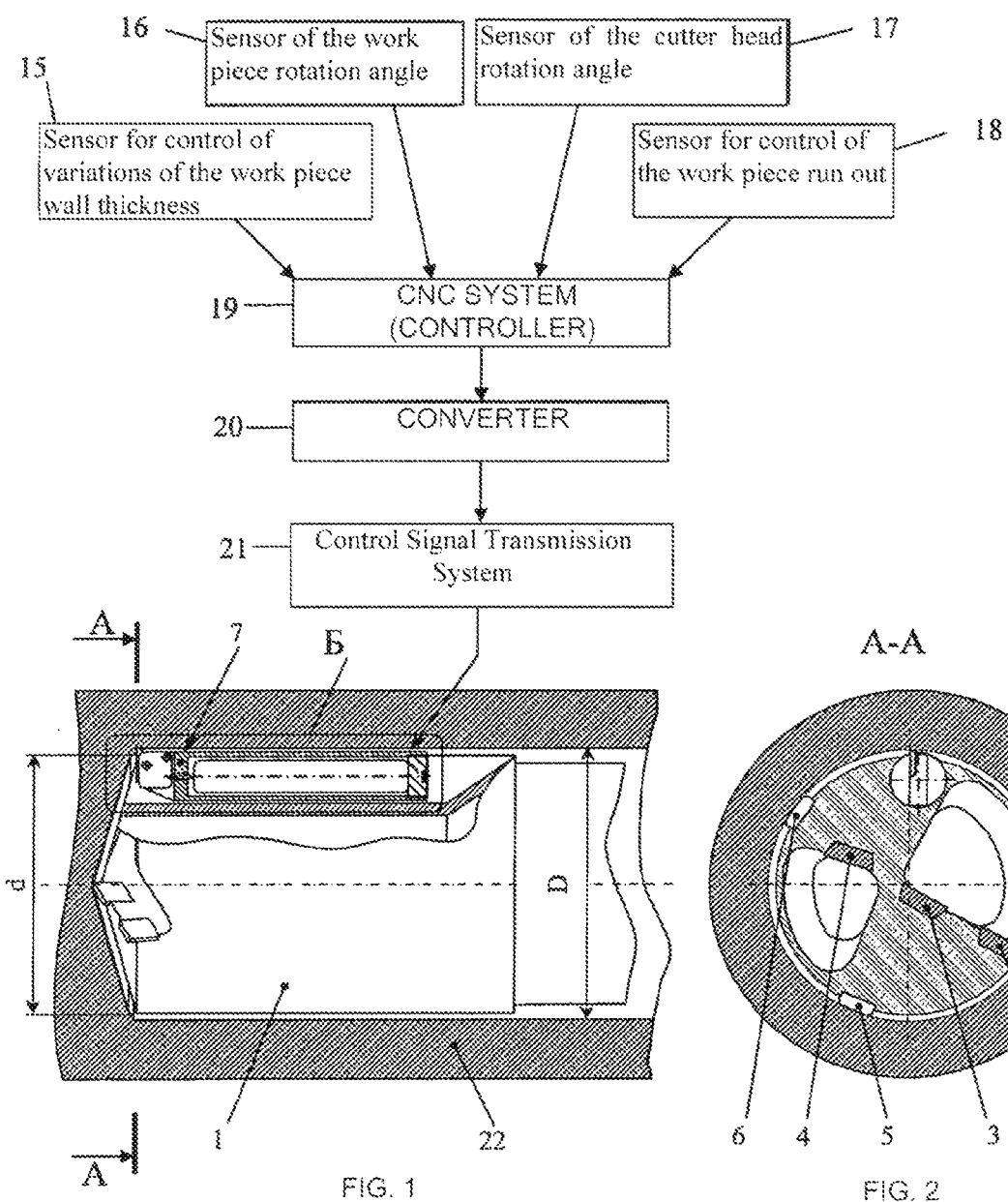
FIG. 1
FIG. 2
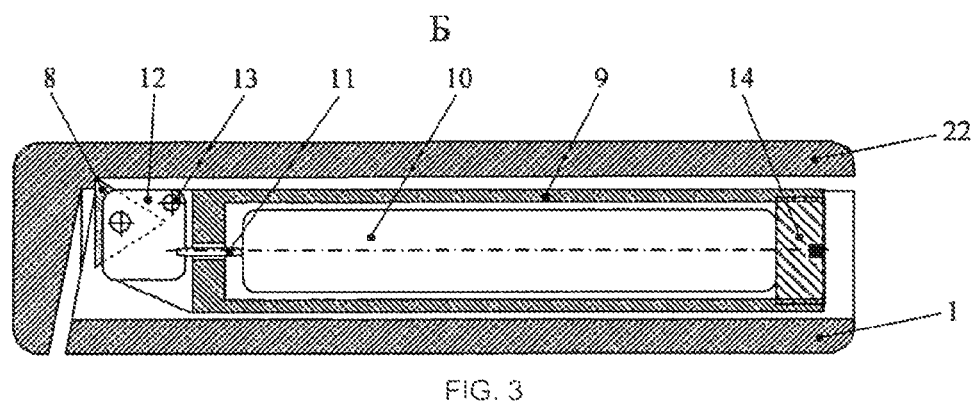
FIG. 3

DEVICE FOR DRILLING OR BORING OPENINGS

CROSS-REFERENCE TO RELATED APPLICATION

This application is a national stage application and claims the benefit of the priority filing date in PCT/RU2010/000427 referenced in WIPO Publication WO/2011/021963. The earliest priority date claimed is Aug. 20, 2009.

FEDERALLY SPONSORED RESEARCH

None

SEQUENCE LISTING OR PROGRAM

None

STATEMENT REGARDING COPYRIGHTED MATERIAL

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND

The invention pertains to metal working, and specifically to devices for drilling or boring holes, thereafter called devices for making holes.

Known are devices for making holes (SU 1063543 A, Dec. 30, 1983; SU 1313586 A1, May 30, 1987; RU 2090315 Ca, Sep. 20, 2007) that have cutter heads and mechanisms by means of which a cutter is set to a specified dimension. In said devices, the specified dimension is set before making a hole, and is not corrected during the hole-making process. Also, the tool deviating from the hole axis is not corrected because it is not possible to control the hole axis while making a hole.

Also known is a device for making holes (RU 44072 U1, Feb. 2, 2005) comprising a cutter head with a device for moving a cutter in a radial direction from the drive whose control circuit input is connected via a converter to a computer numeric control (CNC) system output. The device makes it possible to change a hole size and shape while making a hole according to a preset CNC program by moving the cutter in a radial direction. Motion from the drive to the cutter is transmitted via a rod that passes inside a bar cavity. The rod is longer than the depth of drilling.

In terms of the combination of essential features and the achieved result, the device of patent RU 44072 C1 is the closest to the claimed device and is designated as the prototype.

The device's disadvantage is that during the hole making process the cutter head axis runs off the axis of the specified hole. It is then impossible to determine the runoff amount, let alone to correct it. The link of the cutter movement drive to, the cutter itself via a long rod contributes to increasing the runoff because the rod is insufficient rigid.

SUMMARY

The object of the invention is to develop a device that makes it possible to correct runoff of a cutter (drilling or boring) head from the axis of the specified hole during the hole making process, and thus to improve the accuracy of hole making.

The stated object is achieved in the form of a device for making holes comprising a cutter head with a device for moving the cutter in a radial direction from the drive whose control circuit input is connected, via a converter, to the CNC system output, a sensor for the control of wall thickness variations of the work piece, a work piece rotation angle sensor, a cutter head rotation angle sensor, and a sensor for the control of the work piece run-out, wherein the drive of the device for moving the cutter in a radial direction is made in the form of a linear drive and installed on the cutter head.

Making the drive of the device for moving the cutter in the radial direction in the form of a linear drive and installing it on the cutter head makes it possible to increase the rigidity of the cutter-drive system and thus reduce the amount of possible runoff of the cutter head axis from the specified hole axis. Adding to the device a sensor for the control of variations in work piece wall thickness, a work piece rotation angle sensor, a cutter head rotation angle sensor, and a sensor for the control of work piece run-out, makes it possible to continuously add information into the CNC system about the runoff of the cutter head axis from the specified hole axis, and to transmit corresponding control signals which make it possible to correct the runout to the device for moving the cutter in the radial direction.

FIGURES

FIG. 1 shows a schematic diagram of the claimed device (in a cutter head embodiment with three cutter plates)

FIG. 2 is Section A-A in FIG. 1

FIG. 3 is a detailed drawing B in FIG. 1.

REFERENCE NUMERALS

15—Sensor for control of variations of the work piece wall thickness
16—Sensor of the work piece rotation angle
17—Sensor of the cutter head rotation angle
18—Sensor for control of the work piece runout
19—CNC system (controller)
20—Converter
21—Control signal transmission system

DETAILED DESCRIPTION

The claimed invention comprises a cutter head 1 with cutter plates 2, 3 and 4 and guides 5 and 6, a device 7 for moving the cutter 8 in the radial direction comprising a housing 9, a linear drive 10, a pusher 11, a movable cutter insert 12 installed on the axis 13, and an adjustment plug 14. The cutter 8 is made in the form of a cutter plate and is rigidly fastened to the cutter insert 12. The linear drive 10 control circuit comprises a sensor 15 for the control of work piece wall thickness variations, a work piece rotation angle sensor 16, a cutter head 1 rotation angle sensor 17, a sensor 18 for the control of work piece runout, a CNC system 19, a converter 20, and a control signal transmission circuit 21. The symbol 22 in the drawings pertains to the work piece.

The claimed device works as follows. Before starting to drill and bore a hole, the cutter plate 2 is set to dimension d which is smaller than the hole diameter D, and the cutter 8 is set to the same dimension using the adjustment plug 14. After the operator switches the device operation control to the automatic mode from the CNC system 19, the cutter 8 moves out to the level, of guides 5 and 6. As the cutter head 1 is fed axially, first (by means of cutters 2, 3 and 4) the hole is drilled to dimension d, and then (by means of the cutter 8) boring to the required dimension D is performed. When the hole axis runoff from the specified axis occurs, the sensors 15 and 18 send signals to the CNC system 19; the system 19 processes the signals and, taking into account the readings of the sensors 16 and 17, sends appropriate signals, via the converter 20 and circuit 21 for transmitting control signals, to the linear drive 10 of the device 7 for moving the cutter 8. The linear drive 10 and pusher 11 rotate the insert 12 about the axis 13, moving the cutter 8 by the required amount (determined by the CNC system 19 program). The cutter 8 creates a hole in front of the guides 5 and 6 of the cutter head 1 with the axis shifted in the direction needed in order to eliminate the runoff. Thereafter, the cutter head 1 enters the hole and continues making the hole according to the set parameters.

During further hole making, if a new runoff occurs, the operating cycle of the device is repeated as described above.

Thus, the claimed device, unlike the prototype, makes it possible to produce high-precision holes by controlling the cutter head axis during hole making.

The embodiment described as an example has a drilling head with three cutter plates and is used for drilling holes with a straight axis in solid metal. Other embodiments can have other types of drilling and boring heads, and can be used in any type of drilling and boring machines with all drilling arrangements using standard arrangements for feeding coolant-cutting fluids and chip removal. In these embodiments, the cutter head control can be performed according to the preset program depending on the set objective, for instance, when machining uniform-wall-thickness, out-of-round and curvilinear tubes.

What is claimed:

1. A device for improved accuracy of drilling or boring holes comprising:
   - a cutter head with a plurality of cutter plates and guides;
   - a device for moving a cutter in a radial direction comprising a housing, a linear drive, a pusher disposed at one end of the linear drive and an adjustment plug disposed at an opposite end of the linear drive, and a moveable cutter insert installed on an axis; said cutter is made in the form of a cutter plate and is rigidly fastened to the cutter insert; said linear drive and pusher rotate the insert around the axis; said device for moving a cutter is installed on the cutter head; and
   - a linear drive control unit comprising a sensor for controlling wall thickness of a work piece, a work piece rotation angle sensor, a cutter head rotation angle sensor, a sensor for controlling work piece runout, a computer numeric control output system, a converter, and a control signal transmission circuit; said control signal transmission circuit is connected, via the converter, to an output of the computer numeric control output system; said output system sends signals via the control signal transmission circuit and the converter to the linear drive of the device for moving the cutter.

2. A method for improving accuracy of a device when drilling or boring holes, the method comprising the steps of:
   - setting a cutter plate to a dimension smaller than a hole diameter to be drilled;
   - setting a cutter to the dimension using an adjustment plug;
   - setting operation of the device to an automatic mode from a computer numeric control (CNC) output system;
   - feeding the cutter head axially, first by means of the cutter plate, drilling to the smaller dimensions, and then be means of the cutter, boring to the dimension of the hole diameter;
   - upon diverging of a hole axis from a specified axis, sending sensor signals to the CNC output system; said CNC output system processing the signals taking into account the readings of a work piece rotation angle sensor and a rotation angle sensor, and sends signals, via a converter and control signal transmission circuit, to a linear drive of the device for moving the cutter;
   - the linear drive and a pusher rotating the insert about an axis, moving the cutter by an amount predetermined by the CNC output system;
   - the cutter creating a hole in the front of guides of the cutter head with the axis shifted in the direction needed to eliminate the runoff; and
   - the cutter head entering the hole continuing to make the hold according to newly set parameters.

* * * * *